United States Patent [19]

Nagano

[11] Patent Number: 4,499,981
[45] Date of Patent: Feb. 19, 1985

[54] DAMPER DISC WITH CONCENTRIC SPRINGS INCLUDING HOURGLASS-SHAPED SPRINGS TO REDUCE THE EFFECT OF CENTRIFUGAL FORCES

[75] Inventor: Tamio Nagano, Hirakata, Japan

[73] Assignee: Kabushiki Kaisha Daikin Seisakusho, Neyagawa, Japan

[21] Appl. No.: 424,177

[22] Filed: Sep. 27, 1982

[51] Int. Cl.³ .................. F16D 3/14; F16D 13/68
[52] U.S. Cl. .................. 192/106.2; 192/70.17; 464/64; 464/68
[58] Field of Search ............. 192/106.2, 106.1, 70.17; 464/64, 68, 66; 267/168

[56] References Cited

U.S. PATENT DOCUMENTS

| | | | |
|---|---|---|---|
| 1,089,168 | 3/1914 | Webster | 464/66 X |
| 2,076,373 | 4/1937 | Katcher | 192/106.2 |
| 3,556,273 | 1/1971 | Maucher | 192/106.2 |
| 4,077,619 | 3/1978 | Borlinghaus | 267/4 X |
| 4,239,097 | 12/1980 | Graecen et al. | 192/106.2 |

Primary Examiner—Rodney H. Bonck
Assistant Examiner—David D. House
Attorney, Agent, or Firm—Armstrong, Nikaido, Marmelstein & Kubovcik

[57] ABSTRACT

A damper disc used as a clutch disc of a friction clutch includes a spline hub splined to an output shaft and having a radial flange, a pair of annular side plates arranged at both sides of the flange and having a radially outer portion to which torque is transmitted, and torsion springs arranged at openings in the flange and the side plates. At least some of the torsion springs consist of coaxially arranged double compressible coil springs including a diametrically large outer spring and a diametrically small inner spring. Each of these small springs is hourglass-shaped so that their diameters gradually change along their length and their axially middle portions have the smallest diameters. The diametrically large outer springs may also have an hourglass shape.

5 Claims, 3 Drawing Figures

DAMPER DISC WITH CONCENTRIC SPRINGS INCLUDING HOURGLASS-SHAPED SPRINGS TO REDUCE THE EFFECT OF CENTRIFUGAL FORCES

BACKGROUND OF THE INVENTION

The present invention relates to a damper disc and, more particularly, to a damper disc including torsion springs consisting of coaxially arranged compressible coil springs of large and small diameters.

Generally, damper discs have been employed in clutch discs in automobile and vibration absorbers between marine engines and reduction gears. A known damper disc comprises a hub splined to an output shaft, and a pair of annular side plates arranged at both sides of a radial flange of the hub. One of the side plates has a radially outer portion to which a torque is transmitted. The disc further comprises circumferentially extending torsion springs arranged in openings of the side plates and the hub flange for connecting the side plates and the flange, so that torque vibration in a driving mechanisms may be absorbed by compression and expansion of the springs, in other words, by relative torsion between the side plates and the flange. Some of the known damper discs include such torsion springs that are constructed of coaxially arranged compressible coil springs of large and small diameters. However, these double springs have fixed large and small diameters all along their lengths, respectively. Therefore, when the disc rotates at a high speed, the inner small springs, which are softer that the outer large springs, move outwardly along radii of the disc by centrifugal force, and contact the inner peripheries of the large springs. Consequently, both springs can not be smoothly compressed and expanded, and thus, the intended absorbing effect for the torque vibration can not be acquired. Further, said contact causes wear of the springs and reduces durability thereof.

Accordingly, it is an object of the invention to provide an improved damper disc, overcoming the above-noted disadvantages.

The essence of the present invention is to provide torsion springs including a compressible coil spring of which diameter gradually changes and is smallest at its axially middle portion.

Other and further objects, features and advantages of the invention will appear more fully from the following description of the preferred embodiments of the invention.

DETAILED DESCRIPTION OF THE PREFERRED EMBODIMENTS

Figure 1:
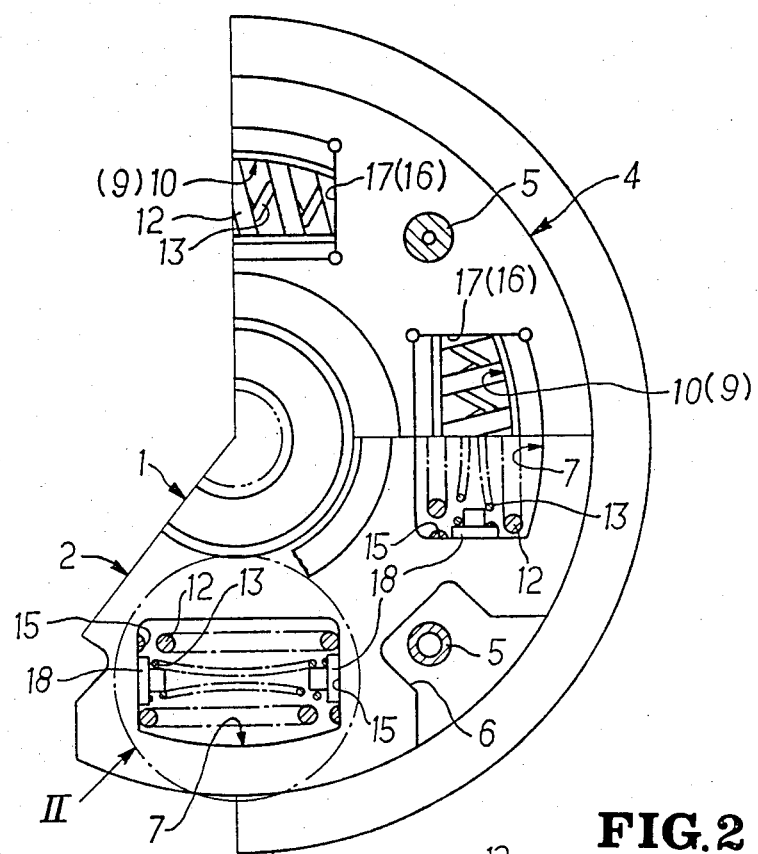
FIG. 1 is a partially cut-away partial elevation of a damper disc according to the invention.

Referring to FIG. 1, a spline hub 1 has inner spline teeth splined to an output shaft (not shown) and a radial flange 2 at its outer periphery. A pair of annular plates, one of which is a clutch plate 3 and the other is a retaining plate 4, are arranged at both sides of the flange 2 and are rotatably fitted around the hub 1. A friction facing (not shown) is fixed to the radially outer portion of the clutch plate 3 through cushioning plates (not shown). Both plates 3 and 4 are connected together by stop pins 5 which extend through circumferentially long recesses 6 formed in outer peripheral portions of the flange 2.

The flange 2 is provided with four circumferentially spaced openings 7. Both plates 3 and 4 are also provided with openings 9 and 10 aligning with the openings 7. Compressible coil springs 12 and 13 respectively having large and small diameters are coaxially arranged in each set of the openings 7, 9 and 10. In the illustrated position, in which the plates 3 and 4 do not torsionally turn with respect to the flange 2, both ends of each large spring 12 are in contact with inner side edges 15, 16 and 17 of the openings 7, 9 and 10, and both ends of each small spring 13 are in contact with the edges 15, 16 and 17 through spring seats 18.

Figure 2:
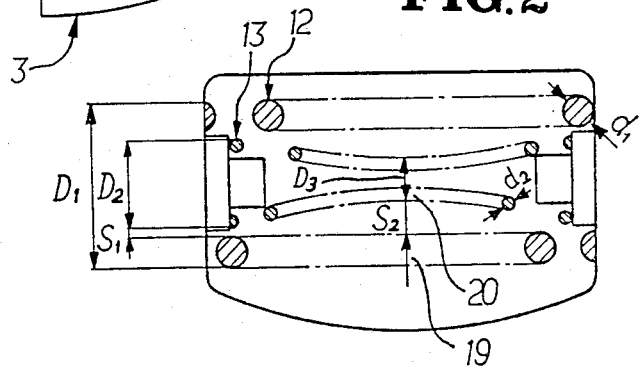
FIG. 2 is a partial enlarged view of a portion indicated by an arrow II of FIG. 1.

Referring to FIG. 2, the diameter D1 of the spring 12 is fixed all along its length. The diameter of the spring 13 gradually changes so that the spring 13 may have the largest diameter D2 at both ends and the smallest diameter D3 at the axially middle portion 20. A diameter d2 of the element wire of the spring 13 is small. A diameter d1 of the element wire of the spring 12 is large.

One of the specific functions or operations of the disc can be as follows. A rotational torque transmitted from a flywheel (not shown) through the facing to the plates 3 and 4 is transmitted through the springs 12 and 13 to the flange 2, and then, is transmitted to the output shaft through the hub 1. During this operation, the torque vibration is absorbed by compression and expansion of the springs 12 and 13. When the disc rotates, the middle portions 19 and 20 in FIG. 2 of the springs 12 and 13 receive centrifugal forces and are forced radially outwardly with respect to the disc. However, since the large springs 12 have the large coil diameter D1 and the large wire diameter d1, and thus, are hard, the middle portions 19 hardly move outwardly. On the other hand, the small springs 13 have the small coil diameters D2 and D3 and the small wire diameter d2, and thus, is axially soft. However, since the diameter D3 of the middle portion 20 is smaller than that D2 of each end, the mass of the middle portion is smaller than that of each end portion, and thus, the middle portion 20 receives a ralatively small centrifugal force. Therefore, the portions 20 move radially only a short distance. Further, each spring 13 is hourglass-shaped, and thus, has large rigidity against a force which is perpendicular to the axial direction of the spring 13. Also by this reason, the middle portions 20 move radially only a short distance. Furthermore, since a space S2 between the middle portions 19 and 20 is larger than a space S1 between the ends of the springs 12 and 13, the middle portions 20 do not come in contact with the middle portions 19 of the springs 12 when the portions 20 move radially outwardly.

According to the invention, as stated hereinbefore, since the small inner springs 13 are hourglass-shaped, the radially moving distance of the middle portion 20 can be very small, and the space S2 between the middle portions 19 and 20 of the springs 12 and 13 can be large. Therefore, the springs 19 and 20 can be prevented from contact even in the high speed driving, and thus, the springs 12 and 13 can be smoothly compressed and expand for achieving an intended absorbing effect for the torque vibration.

The large springs 12 can be the conventional springs, and the elasticity of the springs 13 is similar to that of the conventional springs having a fixed diameter all along their length. Therefore, the illustrated double springs 12 and 13 can have such advantages, which are obtained in the conventional double springs, that the whole construction can be small and that the total spring constant can be high so as to increase a transmittable torque capacity.

The present invention may be employed in a disc in which torsion spring mechanisms operate at two or more steps. The double springs according to the invention may be employed in one or some of torsion springs, of which other torsion springs are compressible coil springs of single construction or rubber. The diameters d1 and d2 of the springs 12 and 13 may be same.

Figure 3:
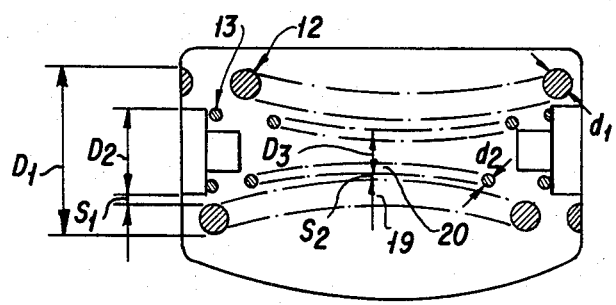
FIG. 3 is a partial enlarged view of an alternative embodiment.

Each of the spring 12 may be hourglass-shaped similar to the spring 13 so that the spring 12 has the smallest diameter at its middle portion, as shown in FIG. 3.

Although the invention has been described in its preferred form with a certain degree of particularity, it is understood that the present disclosure of the preferred form may be changed in the details of construction and the combination, and arrangement of parts may be resorted to without departing from the spirit and scope of the invention as hereinafter claimed.

What is claimed:

1. A damper disc comprising:
   a spline hub splined to an output shaft and having a radial flange;
   a pair of annular side plates arranged at both sides of said flange and having a radially outer portion to which a torque is transmitted; and
   torsion spring means arranged at openings in said flange and said side plates for connecting said side plates to said flange, at least some of said torsion spring means respectively consisting of coaxially arranged double compressible coil springs comprising a diametrically large and a diametrically small spring, each of said small springs being hourglass-shaped so that the diameter thereof gradually changes along the length and the axially middle portion thereof has the smallest diameter.

2. A damper disc of claim 1 wherein said diametrically large springs have a fixed diameter all along the length thereof.

3. A damper disc of claim 1 wherein said diametrically large springs are respectively hourglass-shaped so that their diameters gradually change along their length and the axially middle portions thereof have the smallest diameter.

4. A damper disc of any one of claims 1 to 3 wherein all of the torsion spring means consist of said double springs.

5. A damper disc of any one of claims 1 to 3 wherein a friction facing is connected to the radially outer portion of the side plate through cushioning plates.

* * * * *